US008373581B2

(12) United States Patent
Hassan et al.

(10) Patent No.: US 8,373,581 B2

(45) Date of Patent: Feb. 12, 2013

(54) MOBILE CONTROL NODE SYSTEM AND METHOD FOR VEHICLES

(75) Inventors: Hasib Hassan, Belleville, MI (US); Devendra Bajpai, Bloomfield Hills, MI (US); Uri Levy, Toronto (CA)

(73) Assignee: Magna Electronics, Inc., Auburn Hills, MI (US)

( * ) Notice: Subject to any disclaimer, the term of this patent is extended or adjusted under 35 U.S.C. 154(b) by 504 days.

(21) Appl. No.: 12/664,110

(22) PCT Filed: Jun. 19, 2008

(86) PCT No.: PCT/CA2008/001174

§ 371 (c)(1),
(2), (4) Date: Dec. 11, 2009

(87) PCT Pub. No.: WO2006/058098

PCT Pub. Date: Jun. 1, 2006

(65) Prior Publication Data

US 2010/0171642 A1 Jul. 8, 2010

Related U.S. Application Data

(60) Provisional application No. 60/944,917, filed on Jun. 19, 2007, provisional application No. 60/983,403, filed on Oct. 29, 2007, provisional application No. 60/983,414, filed on Oct. 29, 2007, provisional application No. 60/992,134, filed on Dec. 4, 2007.

(51) Int. Cl.
*G08G 1/123* (2006.01)

(52) U.S. Cl. ........ 340/992; 340/991; 340/988; 340/901; 340/902; 340/905; 340/539.13; 340/539.32; 340/426.18; 455/414.3; 455/556.1

(58) Field of Classification Search .................. 340/992, 340/991, 988, 901, 902, 905, 539.13, 539.32, 340/426.18; 455/414.3, 556.1; 701/200, 701/201, 207, 214, 216
See application file for complete search history.

(56) References Cited

U.S. PATENT DOCUMENTS (Continued)

FOREIGN PATENT DOCUMENTS

| | | |
|---|---|---|
| EP | 1221684 A1 | 7/2002 |
| WO | WO00/77329 | 12/2000 |

(Continued)

OTHER PUBLICATIONS

European Search Report dated Mar. 7, 2012 from European Application No. 08772835.8, the European counterpart to the present application.

*Primary Examiner* — Tai T Nguyen

(74) *Attorney, Agent, or Firm* — Gardner, Linn, Burkhart & Flory, LLP

(57) ABSTRACT

In a mobile control node system and method for a vehicle (630), the mobile control node (624) can interact, via a bi-directional radio link (642), with a transceiver processor unit (628) in the vehicle. The transceiver processor unit (628) is connected to a vehicle control system (120) and allows the mobile control node (624) to function as an input and output node on a vehicle control network (632), allowing remote control of the vehicle and providing functions such as remote or passive keyless entry. Additionally, the system provides a vehicle location function wherein the range and bearing between the mobile control node (624) and the vehicle (630) can be determined and displayed on the mobile control node (624). The range and bearing are calculated by determining the range between the mobile control node (624) and vehicle (630), preferably using a time of flight methodology, and by processing the travel distance of the mobile control node and compass data in order to triangulate the position of the vehicle (630) relative to the mobile control node (624).

17 Claims, 9 Drawing Sheets

U.S. PATENT DOCUMENTS

| | | | |
|---|---|---|---|
| 6,243,022 B1 | 6/2001 | Furukawa | |
| 6,308,083 B2 | 10/2001 | King | |
| 6,420,967 B1 | 7/2002 | Ghabra et al. | |
| 6,650,236 B2 | 11/2003 | Ghabra et al. | |
| 6,738,712 B1 | 5/2004 | Hildebrant | |
| 6,768,420 B2 | 7/2004 | McCarthy et al. | |
| 6,943,666 B2 | 9/2005 | Mooney et al. | |
| 7,109,852 B2 | 9/2006 | Gupte et al. | |
| 7,145,507 B2 | 12/2006 | Luo et al. | |
| 7,228,136 B2 | 6/2007 | Myllymaki et al. | |
| 7,242,321 B2 | 7/2007 | New et al. | |
| 7,301,442 B2 | 11/2007 | Kolpaskey et al. | |
| 2003/0210143 A1* | 11/2003 | Haddad | 340/539.13 |
| 2005/0099275 A1 | 5/2005 | Kamdar et al. | |
| 2005/0128140 A1* | 6/2005 | Luo et al. | 342/357.07 |
| 2006/0049922 A1 | 3/2006 | Kolpasky et al. | |
| 2006/0290518 A1 | 12/2006 | Bingle et al. | |

FOREIGN PATENT DOCUMENTS

| | | |
|---|---|---|
| WO | 2006058098 A2 | 6/2006 |

* cited by examiner

MOBILE CONTROL NODE SYSTEM AND METHOD FOR VEHICLES

CROSS-REFERENCE TO RELATED APPLICATIONS

This application claims the benefit of each of the following provisional patent applications: U.S. 60/944,917 filed Jun. 19, 2007, entitled Remote Starter System for Vehicle; U.S. 60/983,403 filed Oct. 29, 2007, entitled Vehicle Location Finder; U.S. 60/983,414 filed Oct. 29, 2007, entitled Multiple Vehicle Control; and U.S. 60/992,134 filed Dec. 4, 2007, entitled Mobile Control Node System And Method For Vehicles. The disclosures of each of the foregoing applications are incorporated herein by reference in their entirety.

FIELD OF INVENTION

The invention generally relates to wireless networks for use with vehicles, and more particularly the remote control of vehicle functions via a mobile control node such as a key fob or other mobile device.

BACKGROUND OF INVENTION

Many modern vehicles are equipped with key fobs that communicate, via radio, with a receiver in the vehicle to provide services such as remote keyless entry (RKE), remote starting, security and immobilizer functions, etc. Additional systems in the vehicle, such as tire pressure monitoring systems (TPMS) and passive keyless entry (PKE) may also use radio communications between transmitters and a receiver in the vehicle. It is not uncommon to have four or more radio transceivers, typically employing different frequencies ad/or modulations, employed in modern vehicles to provide the variety of desired control functions. As will be apparent to those of skill in the art, the replication of radio transceivers increases the costs of manufacturing the vehicle while still not providing for some of the functionality that may otherwise be desired.

One example of a generally unavailable functionality is a vehicle locator service which provides an indication of at least the range and bearing of the vehicle relative to the key fob held by a user. Another example of a generally unavailable functionality is a key fob which can interact with and/or control more than one vehicle, and/or control or interact with other controllers in an expanded wireless area network.

SUMMARY OF INVENTION

A first aspect of the invention relates to a wireless communication system for a vehicle in which data for a variety of vehicular subsystems or functions are wirelessly communicated to a vehicle control system via a common communication protocol, thereby minimizing costs.

According to this aspect of the invention, a wireless communications system is provided for a vehicle which includes a transceiver processor unit (TPU) for mounting in the vehicle and a mobile control node such as a key fob, cell phone or other mobile device. The TPU includes: a first radio transceiver employing a single communication protocol to perform bi-directional data communications with at least two functional subsystems in the vehicle; a first processor connected to a vehicle control system and operable to receive and transmit data through the transceiver. The mobile control node includes: a second radio transceiver operable to perform bi-direction data communication with at least the TPU; a second processor operable to receive and transmit data through the second transceiver, and a user interface operable to receive input from a user to cause the processor to transmit, via the second transceiver and the first transceiver, a command to the vehicle control system.

Preferably, the two functional subsystems in the vehicle include at least one of a passive keyless entry system and a remote keyless entry system, and at least one of a tire pressure monitoring system and a remote starter system.

The preferred protocol is based on the IEEE 802.15.4/Zigbee standard (the disclosure of which is hereby incorporated herein by reference in its entirety). In the most preferred embodiments, a tire pressure monitoring system, an immobilizer, and a remote key fob which enables keyless entry or passive keyless entry functions, all utilize the preferred wireless communication protocol.

A second aspect of the invention relates to a vehicle locator function wherein a mobile device such as a key fob or cell phone having a user interface provides directional information to the user to direct him or her to a vehicle.

One facet of this aspect of the invention relates to a vehicular locating system, which includes: a first data processor and transceiver unit (TPU) for mounting in a vehicle; and a mobile device that has a second TPU capable of wirelessly communicating with the first TPU, as well as a display operatively connected to the second TPU. The first and second TPUs have a means for estimating a range between each other. The mobile device further includes a means for determining the distance the mobile device travels and a compass element, each of which is operatively connected to the second TPU. As a user moves with the mobile device, at least one of the first and second TPUs process range estimates between the first and second TPUs and inputs from the mobile device travel means and compass element to produce an estimated bearing from the mobile device to the vehicle.

The mobile device preferably has a display screen and outputs a directional bearing on the display screen. If a less expensive interface is desired, the mobile device may alternatively employ a series of lights such as LEDs which are actuated to indicate directional bearing.

Another facet of this aspect of the invention relates to a method for locating a vehicle. The method includes: (i) provisioning the user with a mobile device having a user interface; (ii) provisioning the vehicle with a transceiver processor unit (TPU), wherein the mobile device and the TPU communicate via a wireless data communication link; (iii) periodically estimating the range or distance between the TPU and the mobile device as the user moves with respect to the vehicle; (iv) calculating a direction between the user and vehicle based at least on a change in distance between the mobile device and the TPU; and (v) outputting the calculated direction to the user through the user interface. Preferably, steps (iii) through (v) are repeated on an ongoing basis to assist the user to locate the vehicle. Also preferably, step (iii) employs a time of flight range estimation modality.

A third aspect of the invention relates to a method of determining a range or distance between two devices that wirelessly communicate with one another via a bi-directional data link. One device is preferably a mobile device, which could be a key fob, cell phone or other such mobile device, and the other device is preferably a corresponding transceiver processor unit (TPU) installed in the vehicle. The method includes: (i) determining a first set of raw range estimates from a first ranging modality dependent upon the bi-directional data link; (ii) statistically processing the first set of raw range estimates, utilizing a Statistical Estimator/Predictor or the like, to obtain a first filtered range estimate; (iii) determining a second set of raw range estimates from a second ranging modality dependent upon the bi-directional data link; (iv) statistically processing the second set of raw range estimates, utilizing a Statistical Estimator/Predictor or the like, to obtain a second filtered range estimate; (v) providing each of the first filtered range estimate and the second filtered range estimate to an appropriate model to obtain a statistically more probable range estimate; (vi) providing the statistically more probable range estimate to a dynamic Bayesian network to produce a high probability range estimate; and (vii) outputting the high probability range estimate as an estimate of the range or distance between the wireless devices.

A fourth aspect of the invention relates to a wireless communication system where the vehicular wireless network forms part of a larger network by establishing a wireless communication link with a controller associated with fixed infrastructure, such as with a home security system or a garage door or security gate control system.

One facet of this aspect of the invention relates to a wireless communications system, which includes:

- a first transceiver processor unit (TPU) mounted in a vehicle, the TPU being connected to a vehicle control system and operative to perform wireless bi-directional data communications with at least two functional subsystems in the vehicle by employing a single designated communication protocol including a single modulation scheme;
- a mobile control node having a second TPU for performing bi-directional data communications with at least the first TPU via the designated communication protocol, and a user interface operable to receive user input and transmit, via the wireless communication link between the first TPU and second TPU, a command to the vehicle control system; and
- a controller installed at a substantially fixed, non-vehicular location, wherein the controller includes a third TPU for wirelessly bi-directionally communicating with the first TPU via the designated communications protocol, and wherein the user interface of the mobile control node is operable to receive and transmit user input, via the wireless communication link between the first, second and third TPUs, a command to the controller.

The controller may be a garage door or security gate controller, wherein the user input generates a command to open or close the door or gate. Preferably, the controller TPU and the vehicular TPU are programmed to estimate the range therebetween utilizing a time of flight methodology, whereupon the controller automatically opens or closes the door or gate based on the estimated distance between the vehicle and the door or gate.

Alternatively, the controller may control a home security system. In this case, a vehicular security event detected by the vehicle control system can be communicated to the home security system. Also, the user input may generate a command to arm the home security system.

Another facet of this aspect of the invention relates to a wireless communications system, which includes:

- a first transceiver processor unit (TPU) mounted in a vehicle, the TPU being connected to a vehicle control system;
- a mobile control node having a second TPU for performing bi-directional data communications with at least the first TPU via a single designated communication protocol including a single modulation scheme, and a user interface operable to receive user input and transmit, via the wireless communication link between the first TPU and second TPU, a command to the vehicle control system; and
- a controller for a home security network, wherein the controller includes a third TPU for wirelessly bi-directionally communicating with the first TPU via the designated communications protocol;
- wherein the vehicle TPU is capable of forming a wireless network with the home security controller and, upon joining the network, the vehicle TPU and home security TPU continuously exchange messages to confirm the presence of each other, and wherein an alarm is triggered in the event the messages unexpectedly cease.

Yet another facet of this aspect of the invention relates to a wireless communications system, which includes:

- a first transceiver processor unit (TPU) mounted in a vehicle, the TPU being connected to a vehicle control system;
- a mobile control node having a second TPU for performing bi-directional data communications with at least the first TPU via a single designated communication protocol including a single modulation scheme, and a user interface operable to receive user input and transmit, via the wireless communication link between the first TPU and second TPU, a command to the vehicle control system; and
- a controller for a home security network, wherein the controller includes a third TPU for wirelessly bi-directionally communicating with the first TPU via the designated communications protocol;
- wherein the vehicle TPU and the home security controller TPU are programmed to estimate the range therebetween utilizing a time of flight methodology, and wherein the home security system registers an alarm in the event the estimated distance between the vehicle and unexpectedly increases beyond a threshold distance.

And another facet of this aspect of the invention relates to a wireless communications system, which includes:

- a first transceiver processor unit (TPU) mounted in a vehicle, the TPU being connected to a vehicle control system and operative to perform wireless bi-directional data communications with at least two functional subsystems in the vehicle by employing a single designated communication protocol including a single modulation scheme;
- a camera mounted in the vehicle that is operative to record images under control of the vehicle control system;
- a security system installed in the vehicle that is operative to communicate a security event to the vehicle control system; and
- a mobile control node having a second TPU for performing bi-directional data communications with at least the first TPU via the designated communication protocol, and a user interface operable to receive user input and transmit, via the wireless communication link between the first TPU and second TPU, a command to the vehicle control system;
- wherein, upon detecting a security event, the vehicle control system captures one or more images with the camera and transmits the one or more images to the mobile control node via the wireless communication link between the first TPU and second TPU.

Another aspect of the invention relates to a tire pressure monitoring system (TPMS) for a vehicle. The TPMS includes a first data processor and transceiver unit (TPU) for mounting at a substantially pre-designated location in the vehicle, which location has a substantially different spacing from each tire monitored by the system. A sensor unit is disposed in each tire or wheel of the vehicle to be monitored. Each sensor unit includes a transducer for monitoring pressure, a transceiver for wirelessly communicating with the TPU, and a data processor operatively coupled to the transducer and transceiver for sending messages to the TPU which include a unique ID of the sensor unit and tire pressure data. Means are executed by the TPU and each sensor unit for wirelessly estimating the physical distance therebetween. The TPU determines the tire position of each sensor unit by matching the estimated sensor unit/TPU distance against a known tire/TPU distance.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

In the following discussion a mobile control node in accordance with the present invention is generally referred to as a "key fob". While it is contemplated that a mobile control node in accordance with the preferred embodiment will, at least presently, most commonly be implemented as a key fob, the present invention is not so limited and the mobile control node can be implemented in a variety of ways including on a variety of mobile computing devices or other devices (which may not be associated with any keys) such as a cell phone and hence the term "key fob" is used herein merely as a generic tom to describe a mobile control node.

This application incorporates by reference in its entirety United States Patent Application Publication No. US 2008/0117079, published May 22, 2008, entitled "Remote Starter for Vehicle". This publication describes, inter alia, a key fob system, which allows an operator to remotely control numerous vehicle functions and/or receive status information about the vehicle for display on a view screen incorporated in the key fob.

The conventional vehicle utilizes primarily four short-range RF based peer-to-peer wireless systems, such as Remote Keyless Entry (RKE), Passive Keyless Entry (PKE), Immobilizer and Tire Pressure Monitoring System (TPMS). RKE and TPMS typically use the same high frequency with different signal modulation (315 MHz for US/NA, 433.32 MHz for Japan and 868 MHz for Europe), whereas the PKE system often requires a bidirectional communication at a low frequency (125 KHz) between the transponder card/key FOB and the receiver module through antennas embedded inside the door handles and a unidirectional high frequency communication from key FOB/transponder card to the receiver module. The Immobilizer system also typically uses a low frequency bidirectional communication between the key and the receiver module. Receivers for these systems are often standalone and/or reside in various control modules like Body Control Module (BCM) or Smart. Junction Block (SJB). By using different radios with different carrier frequencies and/or modulation schemes, collisions between transmissions from separate wireless communication systems in the vehicles were avoided in the prior art.

System Overview

The preferred embodiment minimizes cost by employing a wireless communication infrastructure for a vehicle in which data for some or all of the foregoing subsystems or functions are wirelessly communicated to a single vehicle control system interface by utilizing a common communication protocol having a common carrier frequency and modulation scheme. In addition, as a result of the use of a common communication protocol, the functionality of the vehicle may be extended to seamlessly interact with a variety of wireless area networks installed in fixed infrastructure, as discussed in greater detail below.

Figure 1:
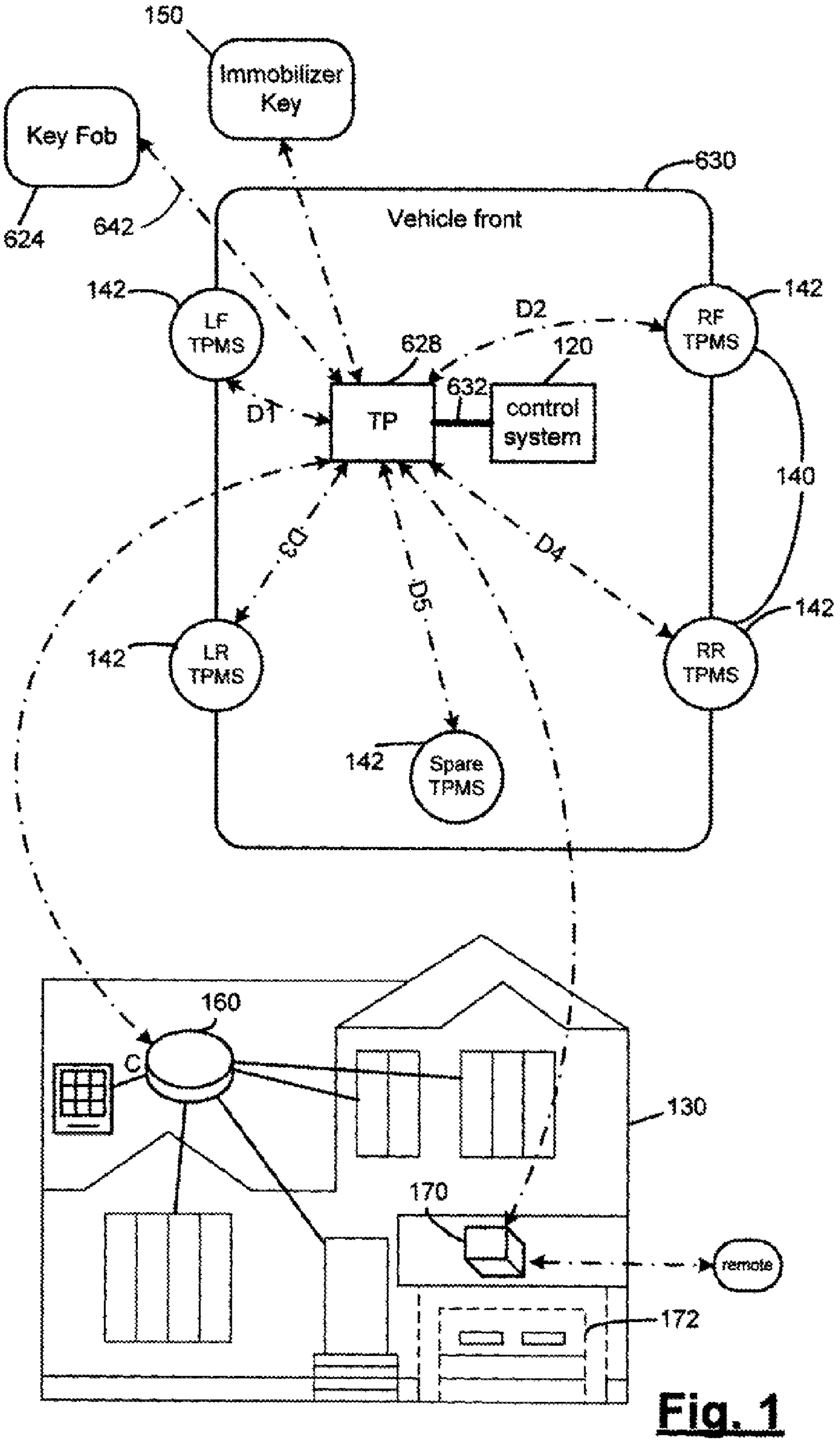
FIG. 1 shows a schematic diagram of a wireless communication system in accordance with a preferred embodiment.

FIG. 1 shows a wireless vehicular communication network 110 relative to a vehicle 630. As its base element, the network 110 includes a remote vehicle control (RVC) subsystem, alternatively referred to herein as a mobile control node system 620. As illustrated, subsystem 620 comprises a mobile control node, or key fob, 624 and a base transceiver/processor (TP) unit 628 which is installed in the vehicle 630.

TP unit 628 is electrically connected to necessary vehicle subsystems by a suitable connection 632. Preferably, the vehicle 630 in which TP unit 628 is installed includes a local control bus, such as a CAN Bus (i.e. Controller Area Network—ISO 11898/11519), which provides access to a vehicular control system 120. In this case, connection 632 preferably includes a bidirectional communication interface to the local control bus, in addition to any electrical power supply or other necessary connections for operation of TP unit 628, as will occur to those of skill in the art.

In the preferred embodiment, the network 110 and TP unit 628 implements the IEEE 802.15.4/Zigbee protocols and standard which are incorporated herein, in their entirety, by reference. While the invention is not limited to the use of the 802.15.4/Zigbee protocols, the low power, low cost benefits of such a protocol and standard are believed to offer numerous benefits. For example, one advantage of the WEE 802.15.4 standard is that it typically has a communication range of 50 meters or thereabouts (about 5 to 500 meters depending on the environment and power consumption), which is considerably longer than the likes of the BLUETOOTH® standards (that typically is restricted to a range of about 10 meters). In addition, the IEEE 802.15.4 standard offers a choice of transmission frequencies. For example, it offers 16 channels in the worldwide, unlicensed, band of 2405-2480 MHz at data rates of 250 kbps. The protocol is also optimized for low duty-cycle applications (less than 0.1 percent), offers low power consumption (allowing battery life from months to years), supports multiple topologies (such as star, peer-to-peer, mesh and/or cluster topologies and/or the like), provides 64 bit addressing, and offers full hand-shaking for reliable data transfer. In addition, the preferred 802.15.4/Zigbee communication protocol includes collision handling and/or avoidance mechanisms, permitting a single carrier frequency or frequency band (which is established on initiation of vehicular wireless network) and a single modulation scheme to be employed amongst a variety of devices.

Thus, TP unit 628 is operable to establish and/or maintain a bidirectional data link 642 with one or more key fobs 624, as described in more detail below, utilizing the preferred communication protocol. Further, TP unit 628 is used to communicate with other wireless devices or subsystems in or associated with vehicle 630, utilizing the preferred communication protocol. These include a TPMS subsystem 140 and/or an immobilizer key 150. The key fobs 624 provide or support RKE and/or PKE functions. If desired the key fobs 624 can also provide an Immobilizer function, and function as a remote display for TPMS. The key fobs, with an appropriate user interface, can also provide a remote ignition start function and a whole host of other remote vehicle control or other customer features that are controlled via the key fob 624. The immobilizer key 150 can be used to provide the Immobilizer function instead of key fob 624. The immobilizer key 150 can also be used to implement the PKE function instead of key fob 624. As such, the immobilizer key 150 incorporates a wireless transceiver utilizing the preferred communication protocol, as discussed in greater detail below. The TPMS comprises a number of individual sensor units 142, each of which incorporate a wireless transceiver utilizing the preferred communication protocol, so as to communicate with the vehicle control system 120 via the TP unit 628.

Collectively, the one or more fobs 624, TPMS sensor units 142 and immobilizer key 150 are preferably arranged in a star topology where the TP unit 628 functions as the wireless area network coordinator, but it will be understood that other topologies may be implemented. For instance, the TPMS sensor units 142 may form their own local subnetwork, communicating with a central TPMS coordinator (that may be a sensor unit itself or a discrete device), in which case the wireless system as a whole will assume a tree topology.

The TP unit 628 may also be utilized as either a gateway (utilizing a different communication protocol) or more preferably as a local coordinator (utilizing the preferred Zigbee protocol) within an extended wireless area network associated with fixed infrastructure. For instance, FIG. 1 shows a house 130 which may be associated with one or more controllers, such as a home security system 160 and/or a garage door or security gate system 170, with which the vehicle 630 may interact. For instance, the vehicle key fob 624 may be utilized as an additional garage door or security gate actuator. Also, the vehicle 630 may become an object monitored by the home security system 160, where an unexpected withdrawal of the vehicle from the home security network may trigger an alarm.

In the preferred embodiment, the TP unit 628 provides location awareness in the sense that it is able to estimate the range or distance between it and another wireless transceiver that communicates with the unit 628. This is quite advantageous, enabling many functions to be controlled based on distance as an input parameter. For instance, the distance between the key fob 624 and the vehicle 630 may control the unlocking of vehicle doors for PKE. Similarly, in an expanded wireless area network, the estimated distance between the vehicle 630 and a garage door or security gate 172 may trigger the door or gate to automatically open, provided that other security and safety conditions are met.

Configuration of Base Transceiver Processor

Figure 2:
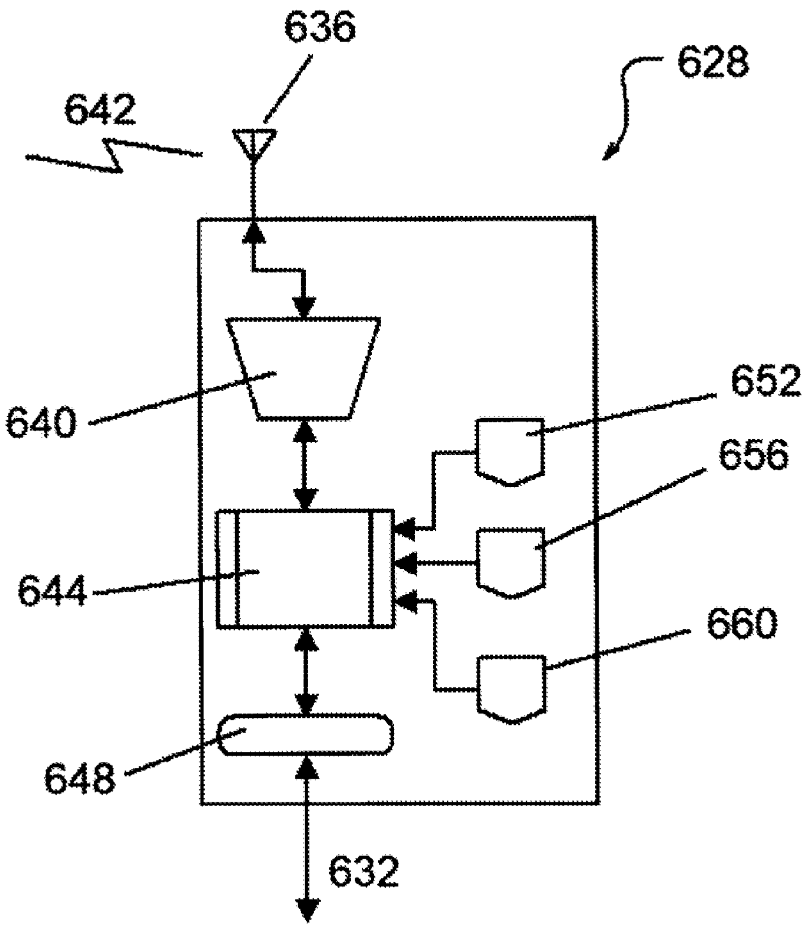
FIG. 2 shows a schematic representation of a transceiver processor unit for use with the system of FIG. 1.

A presently preferred configuration of TP unit 628 is illustrated schematically in FIG. 2. As illustrated, TP unit 628 includes at least one antenna 636 which is operatively connected to a radio transceiver 640. Each antenna 636 is located at an appropriate location on the vehicle in which TP unit 628 is installed and can be any suitable antenna structure including dipole, patch or microstrip structures.

TP unit 628 further includes a processor unit 644 which can perform various algorithmic and mathematical operations, as discussed below in more detail. While it is contemplated that sixteen bit processors, such as an S12XD processor, as manufactured by Freescale Semiconductor, 6501 William Cannon Drive, West, Austin, Tx., USA can be employed as processor unit 644, in a present embodiment of the invention, processor unit 644 is a thirty two bit processor, such as the V850ES/FG3 processor, manufactured by NEC Electronics Corporation, Kanagawa, Japan, and it includes both a program memory, which can be EPROM or Flash memory, and a data storage memory wherein at least some portion of the data storage memory is preferably a static memory. Processor unit 644 is connected to radio transceiver unit 640 to receive and/or transmit data over data link 642 as necessary.

An I/O interface 648 connects processor unit 644 to connection 632 which, as mentioned above, can be a CANBUS or other controller area network, or can be direct control connections to various subsystems in the vehicle in which TP unit 628 is installed. I/O interface can be an integrated part in processor unit 644, or can be a separate device as needed. Processor unit 644 can also be connected to various sensors, either directly (as shown in FIG. 2) or indirectly via connection 632, and such sensors can include an direction determining element such as electronic compass 652 (preferably a three-axis compass), an accelerometer 656 (preferably a three-axis accelerometer) and/or an inclinometer 660. The electronic compass may comprise a magneto-responsive sensor such as a hall-effect sensor, a flux-gate sensor, a magneto-resistive sensor, a magneto-inductive or a magneto-capacitive sensor. Suitable compass-direction sensors and associated compass sensing systems are disclosed in published U.S. Patent Applications: 20080130149; 20080055757; 20060061008; and 20060164230, and in issued U.S. Pat. Nos. 7,331,115; 6,992,902; and 5,802,727 (the entire disclosures of which are hereby incorporated by reference herein in their entireties).

Configuration of Mobile Control Node/Key Fob

Figure 3:
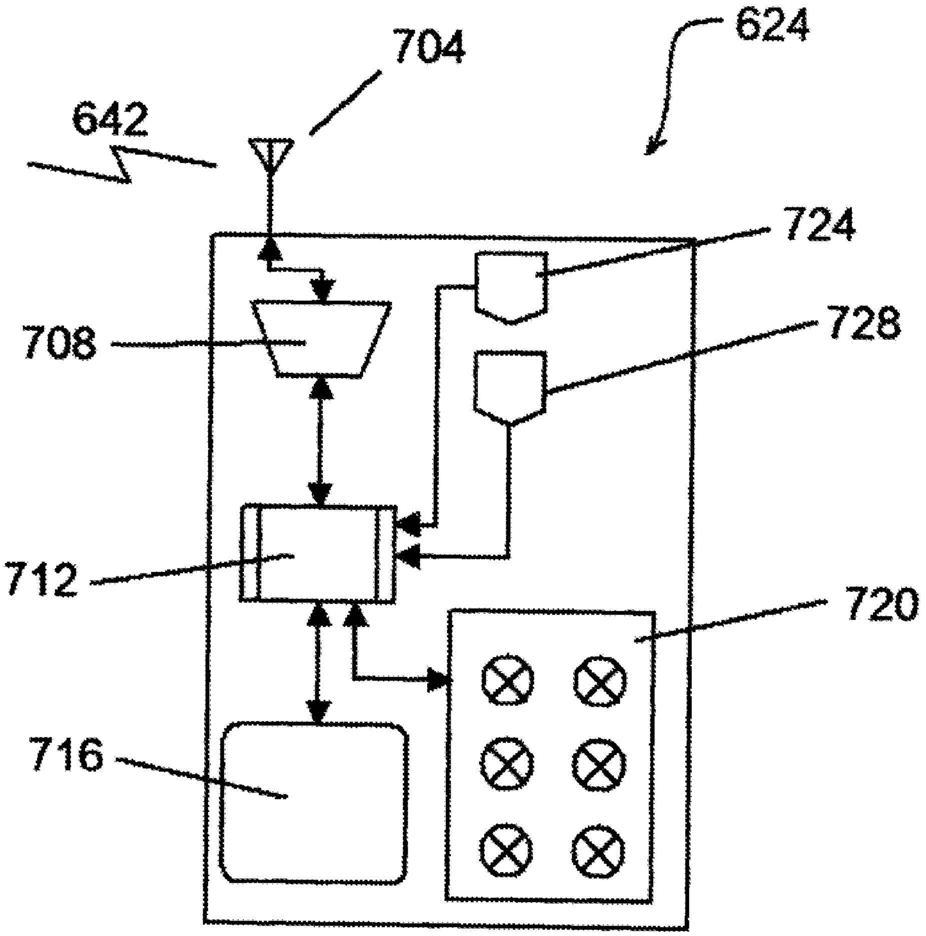
FIG. 3 shows a schematic representation of a mobile control node for use with the system of FIG. 1.

A preferred configuration of key fob or mobile control node 624 is illustrated schematically in FIG. 3. Control node 624 includes at least one antenna 704 and a radio transceiver 708 which is operable to establish and/or maintain a bidirectional data link 842 with radio transceiver 640 in a TP unit 628. Mobile control node 624 further includes a processor unit 712 which can perform various algorithmic and mathematical operations as discussed below in more detail. In a preferred embodiment, processor unit 712 can be a JN5139 or a JN 5147, manufactured by Jennie Ltd., Furnival Street, Sheffield S1 4QT, South Yorkshire, UK and it includes both a program memory, which can be EPROM or Flash memory, and a data storage memory wherein at least some portion of the data storage memory is preferably a static memory.

Transceiver unit 708 can be integral with processor unit 712, as is the case with the JN5139, or can be a separate device, as desired. In either case, processor unit 712 is connected to transceiver unit 708 to receive and/or transmit data over data link 642 as necessary. Mobile control node 624 further includes a user interface system connected to processor unit 712 and which preferably comprises at least a display 716 and a keypad 720.

In the illustrated embodiment, display 716 is a multi-pixel addressable display, such as a liquid crystal display (LCD) or an electroluminescent (EL) display or an electrochromic (EC) display or an inorganic light emitting diode display (LED) or an organic light emitting display (OLED) or an E-ink display, and keypad 720 includes two or more user operable input keys. The display desirably may have some form of back lighting to enhance visibility or viewability of the displayed information in low lighting conditions. The display 716 is preferably "smart" enough to determine whether it is daytime or night time, such that back lighting may only be activated or lit when the surrounding lighting conditions are at or below a threshold level to save the battery life. For example, key fob or mobile control node 624 may comprise a photo sensor or photo sensors such as a photo transistor(s) or a photo diode(s) with associated light sensing circuitry such as is disclosed in U.S. Pat. No. 5,285,060 (the disclosure of which is hereby incorporated herein by reference in its entirety).

It is contemplated that display 716 can be a touch screen, in which case keypad 720 can be implemented via "soft keys" displayed on display 716. Alternatively, if keypad 720 is a physical set of keys, appropriate labels for one or more of the keys of keypad 720 can be displayed on display 716 allowing for the reassignment and reuse of the limited set of keys, as appropriate, for the current function of mobile control node 624.

Mobile control node 624 preferably further includes a distance determining element such as a pedometer or accelerometer 724 (preferably a three-axis accelerometer) and a direction determining element such as an electronic compass (preferably a three-axis compass) 728, each of which is operably connected to processor unit 712. These sensors are preferably employed to enable a vehicle locator function as discussed in greater detail below, but may also be used in isolation, for instance to provide a user compass or pedometer. In addition, the accelerometer 724 is useful to provide a signal to "wake" the mobile control node 624 from a period of inactivity when the node 724 may be in a low power consumption sleep mode.

Mobile control node 624 further includes a power supply (not shown) which can be an appropriate disposable battery, such as a lithium battery, or a rechargeable battery, such as a lithium ion or nickel metal hydride battery. In the latter case, mobile control node 624 will further comprise appropriate charging control circuitry. If the battery is rechargeable, it is desirable that it be recharged while driving the vehicle, as known in the art per se, such as by docking or otherwise connection of key fob or mobile control node 624 to a power source of the vehicle or, alternately, by power inductive-coupling of electrical power to the key fob or mobile control node 624 without a need to connect via wires or other physical direct connection.

Configuration of Other Devices

Figure 7:
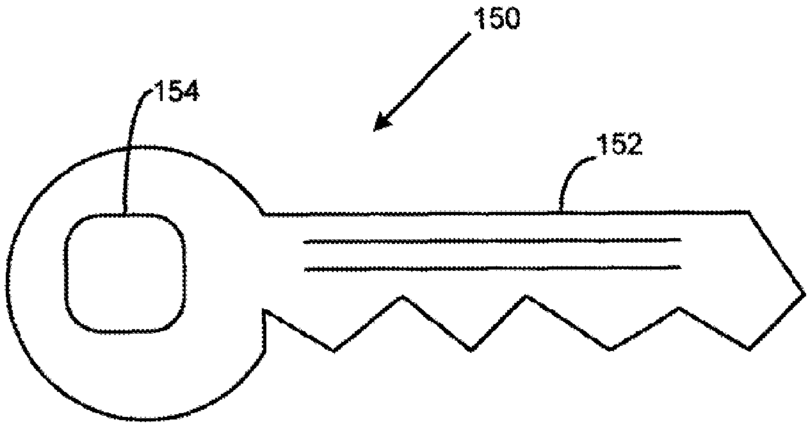
FIG. 7 shows a schematic representation of the structure of an immobilizer key useful with the system of FIG. 1.

The configuration of other devices is preferably similar to that of the mobile control node 624. For example, FIG. 7 shows the immobilizer key 150, which comprises a mechanical or electrical key portion 152, as known in the art per se, that is inserted into a key slot in the vehicle. The immobilizer key 150 also preferably includes an integrated processor/transceiver 154 such as provided by the JN5139. The immobilizer key is preferably battery powered, but it can be powered through inductive coupling or via a power connection formed when the key portion 152 is inserted in a powered key slot, in which case the key portion is electrically connected to the integrated processor/transceiver 154. Similarly, the TPMS sensor unit 142 includes a pressure transducer (not shown) that interfaces with an integrated processor/transceiver 154 such as provided by the JN5139. The TPMS sensor unit 142 may be battery powered, or use some other energy harvesting device such as inductive power coupling or other mechanism for converting the motion or vibration of the wheel into electrical energy for powering the sensor unit.

Remote Control Function

As TP unit 628 is connected to connection 632, mobile control node 624 can appear as a node in the controller area network of vehicle 630 with data link 642 transparently effecting the transfer of data between mobile control node 624 and the controller area network/vehicle control system 120.

In such as case, information from the controller area network or vehicle control system 120 can be displayed on display 716. For example, a security system in vehicle 630 and connected to the controller area network, and to TP unit 628 via connection 632, can provide an indication of the present security status (locked, unlocked, door ajar, etc.) onto the controller area network and mobile control node 624 can display, on display 716, a corresponding and appropriate status indicator. Similarly, tire pressure information from a TPMS can be displayed on display 716.

Further, commands to devices or subsystems of vehicle 630 can be input at keypad 720 of mobile control node 624 and transmitted to TP unit 628 and then, through connection 632, onto the controller area network or vehicle control system. As will be apparent to those of skill in the art, keypad 720 can include predefined keys for functions such as locking or unlocking a vehicle, opening a tailgate, activating a "panic" alarm, initiating a remote start of the vehicle engine, etc. and remote control node 624 can serve as a key fob for a remote keyless entry system. In such a case, the appropriate lock, unlock, etc. command is selected by the user with keypad 720 and that command is forwarded to TP unit 628 which then places the command onto the controller area network (or into any other type of vehicle bus network or protocol of the vehicle, such as a LIN network or a MOST network or a FLEXRAY network or a wireless network) in the vehicle to effect the desired response of locking, unlocking doors, etc.

Processor 712 can also execute an appropriate program to cause mobile control node 624 to substantially emulate a wide variety of controls and displays of vehicle 630, as desired. For example, mobile control node 624 can operate to emulate the tuning, volume and other controls of an in vehicle entertainment system when the user is outside of the vehicle. In such as case, display 716 can display appropriate status indicators (i.e.—the channel the radio is presently tuned to, etc.) and labels ("volume up", "volume down", etc.) for soft key functionalities assigned to keys on keypad 720, etc. Display 716 can also display an appropriate status indicator for other controlled functions, such as the status of a requested remote starter activity, etc.

Range Estimate

As previously discussed, the TP unit is preferable able to estimate the range between itself and another transceiver in communication with it. In the preferred embodiment, the range estimate is determined using at least one range estimation modality, and preferably using two, independent, range estimation modalities. Specifically, the time of flight (ToF) for a transmission between TP unit 628 and another transceiver such as mobile control node 624 is employed as a primary modality. If another modality is desired, the radio signal strength at which a transmission is received at each of the TP unit 628 and other transceiver can be employed as the other modality.

When a combination of ToF and other modalities is employed, as described below in more detail, the results obtained from each of these modalities is statistically processed and, eventually, appropriately combined to provide an estimate of the range between TP unit 628 and another transceiver. For example, the range between the vehicle and mobile control node 624 can be determined such that, as the user holding mobile control node 624 moves, the accelerometer 724 in mobile control node 624 provides information with respect to the movement of mobile control node 624. This movement information is combined with the previous range estimates and with range estimates made at each new location to determine a bearing between mobile control node 624 and TP unit 628. (This example is utilized below to describe how range is estimated, which will be applicable to any TP unit/transceiver pair).

As will be apparent to those of skill in the art, a variety of ToF implementations and techniques are well known. For example, one possible ToF method is described in, "RF Time of Flight Ranging for Wireless Sensor Network Utilization", by Lanzisera, Lin and Pister, University of California, Berkeley, published at "Workshop on Intelligent Solutions in Embedded Systems (WISES '06)", Vienna, June 2006. The contents of this publication are incorporated herein, in their entirety, by reference.

In another suitable ToF technique, employed by preferred embodiment, when the vehicle location process commences, each of mobile control node 624 and TP unit 628 sends data to the other of mobile control node 624 and TP unit 628 on a regular basis. As is well known, the time of required for the radio transmission to propagate from one location to another is related to the distance between the two locations.

While it is presently preferred that range estimation be performed with a ToF modality and a second independent modality, it is also contemplated that two different ToF implementations can be employed, such as a combination of the ToF system suggested by Lanzisera et al. and the ToF system described below.

At mobile control node 624, radio transceiver 708 determines the roundtrip ToF for each data transmission from mobile control node 624 to TP unit 628 and back to mobile control node 624 by comparing the time at which the data transmission was received from TP unit 628 with the time the original transmission was sent from mobile control node 624, less a predetermined time delay for processing of the transmission at TP unit 628.

Similarly, at TP unit 628, radio transceiver 640 determines the roundtrip ToF for each data transmission from TP unit 628 to mobile control node 624 and back to TP unit 628 by comparing the time at which the data transmission was received from mobile control node 624 with the time the original transmission was sent from TP unit 628, less a predetermined time delay for processing of the transmission at mobile control node 624.

For the RF signal strength modality, radio transceiver 708 determines the RF signal strength as each data transmission from TP unit 628 is received and compares that received RF signal strength with the signal strength of previous data transmissions received from TP unit 628. Radio transceiver 640 performs a similar operation for each radio transmission received from mobile control node 624. As is well known, the change in RF signal strength for a radio transmission propagating from one location to another is related to changes in the distance between the two locations.

Figure 4:
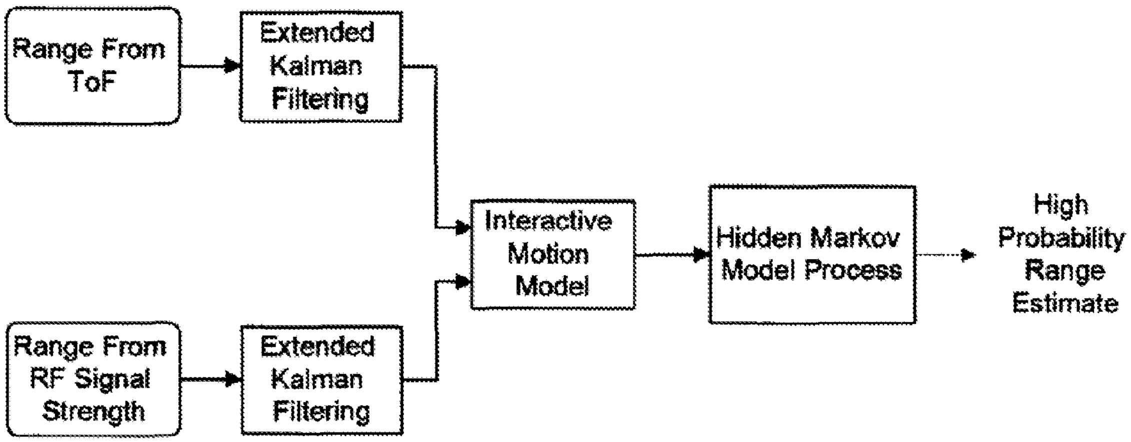
FIG. 4 shows a schematic representation of the range estimation process used with the system of FIG. 1.

FIG. 4 shows the processing path for each of the ToF data and the received RF signal strength data in mobile control node 624. Specifically, a series of raw estimates of range, derived from the ToF data from radio transceiver 708, are input to a Statistical Estimator/Predictor, such as an Extended Kalman Filter (EKF) or other suitable Adaptive Recursive Least Square (RLS) Filtering, Prediction and Tracking Filter. Depending upon the processing capacity of processor 712, it is expected that twenty or more raw estimates will be input to the EKF, which then processes those raw estimates using appropriate range measurement variance and Plant variance models to produce a filtered range estimate.

Similarly, a series of raw estimates of range, derived from the RF Signal strength data from radio transceiver 708, are input to another Statistical Estimator/Predictor, again such as an EKF. Again, depending upon the processing capacity of processor 712, it is expected that twenty or more raw estimates will be input to the EKF, which then processes those raw estimates using appropriate RSSL/LQI (Received Signal Strength Indication/Link Quality Indication) measurement variance and plant variance models to produce a filtered range estimate.

Each of the filtered range estimate from the ToF data and the filtered range estimate from the RF Signal Strength data and then input to a Multiple Models Tracking Method, such as an Interactive Motion Model (IMM) which acts upon these inputs to produce a single, statistically more probable, range estimate which is next provided to a statistical model, such as a Hidden Markov Model (HMM) process or other dynamic Bayesian network. Finally, the HMM process operates with the range estimate from the IMM to produce a high probability range estimate.

While the embodiment discussed herein employs EKF, IMM and HMM estimators, filters and models to statistically process the ToF and RF Signal Strength data, the present invention is not limited to the use of these filters and processes and any suitable statistical and/or physical modeling and analysis processes can be employed, as will be apparent to those of skill in the art. For example, Kalman filters, Particle Filters, Gaussian and non-Gaussian Mixture Models, amongst others, can be used instead of or in conjunction with, the presently preferred EKF. Neural Networks, Independent Component Analysis or other models and be used instead or, or in conjunction with, the presently preferred IMM and Fuzzy Logic, Markov Decision Processes, etc. can be used instead of, or in conjunction with, the presently preferred HMM.

A similar processing path is implemented in TP unit 628 for the ToF and RF Signal Strength data from radio transceiver 640 to also produce a high probability range estimate in TP unit 628.

Tire Pressure Monitoring System

As shown in FIG. 1, each tire of the vehicle 630 may include a TPMS sensor unit 142 (such as is utilized and disclosed, for example, in U.S. Pat. Nos. 7,053,761; 6,731,205 and 6,294,989, the disclosure of which are hereby incorporated herein by reference in their entireties) and send tire pressure data to TP unit 628. In addition to the unique ID for each tire, which may be provided by the unique address of every device in a Zigbee network or as part of the application layer, the estimated distance between TP unit 628 and each tire can be used to identify which tire it is (LF or RF or LR or RR or Spare). This can be achieved by packaging the TP unit 628 in a location where it has a unique distance between the unit and each tire, such as shown in FIG. 1 by reference indicators D1, D2, D3, D4 and D5. The tire pressure data may be communicated by the TP unit 628 to another processor in the vehicle control system 120, or the TP unit 628 may be programmed to execute the tire monitoring function. Thus, the vehicle may read or determine the tire pressures and execute an action such as alerting the driver of low tire pressure on vehicle instrument display panel. Also, upon demand from the mobile control node 624 (such as in response to a user input), the vehicle may transmit the data or results to the mobile control node using the wireless communication link.

Immobilizer

As shown in FIG. 1, the immobilizer key 150 may communicate with the TP unit 628 to establish a valid engine start key. For instance, as an application, an appropriately encrypted unique ID for the key, such as the vehicle ID number (VIN), can be communicated between the key 150 and TP unit 628 in order to establish a valid key. Once a valid key is established, the vehicle control system 120 can disable the immobilizer function (which function is normally enabled), allowing the engine to start. The distance between the TP unit 128 and the key 150 is preferably also monitored and unless it is determined to be within a specified, relatively short, range, the vehicle control system 120 preferably does not disable the immobilizer function, thus adding an extra layer of security.

Passive Keyless Entry

The high probability range estimate produced in TP unit 628 can be employed for a variety of functions in addition to the vehicle locator function described in greater detail below. For example, the high probability range estimate can be used as part of a Passive Keyless Entry (PKE) system. PKE systems operate such that the security system in a vehicle deactivates when a user holding an authenticated key fob is within a specified proximity. However, such systems generally suffer from disadvantages in that they cannot determine the proximity of the user to the vehicle with much accuracy. Accordingly, additional conditions are applied to such systems to prevent false determinations of user proximity, such as requiring the user to touch a door handle before deactivating an alarm system and/or unlocking the vehicle.

In the preferred embodiment, the high probability range estimate produced as described above can be employed by the PKE system. In this case, the range within which a user must be located to deactivate security systems can be defined very closely to the vehicle as the presence of the user within this defined perimeter can be determined with a high level of confidence. Accordingly. The PKE system can be implemented to unlock the vehicle without requiring the user to touch, or move, the door handle.

Figure 8:
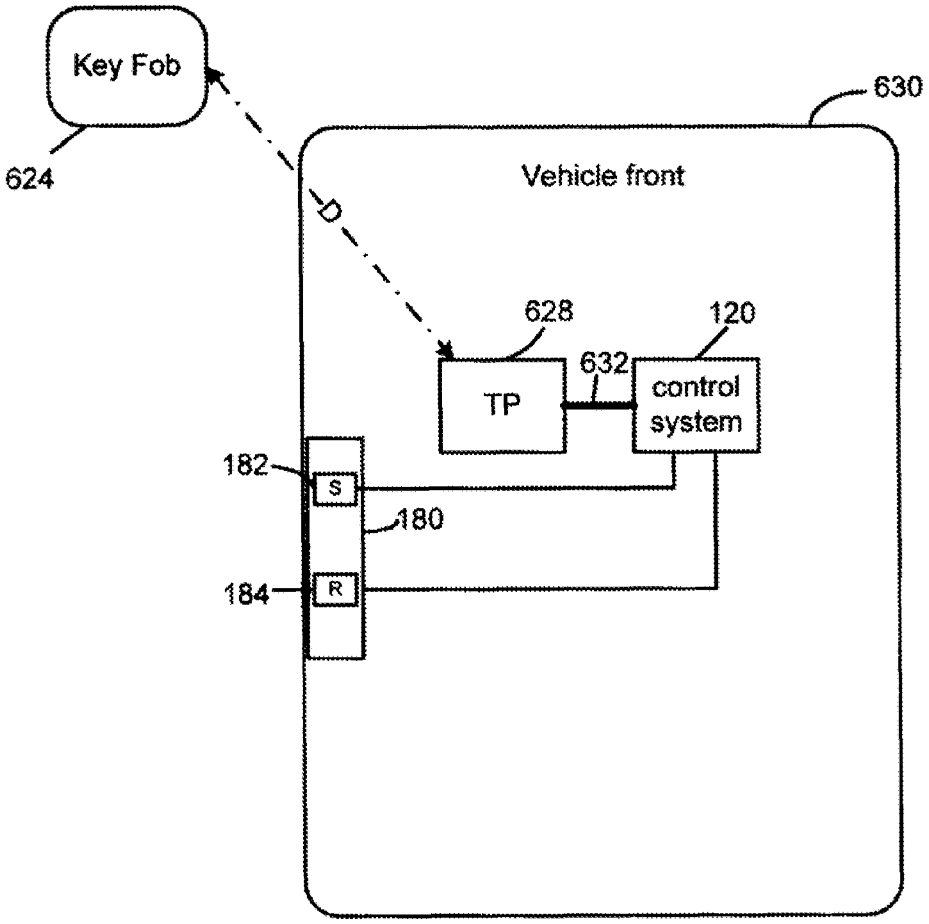
FIG. 8 shows a schematic representation of a vehicle door control subsystem, provided in the system of FIG. 1.

Optionally, for added safety, the door may not unlock automatically as the driver approaches the vehicle. Rather, the vehicle control system 120 may wait for the switched signal for the door handle as the driver pulls the door and actuates the unlocking function. As shown schematically in FIG. 8, a switch 180 can be embedded inside door handle mechanism 182, such as disclosed in U.S. Pat. No. 6,977,619 (the disclosure of which is hereby incorporated by reference herein in its entirety). The delay between pulling the door handle 182 and actuating the unlocking function is preferably minimal enough such that it does not appear to be a nuisance to the driver. Upon receiving an unlock signal from the door handle 182, the TP unit 628 (or, more generally, the vehicle control system 120) may actuate a relay or solenoid 184 directly to unlock the door. The passive unlocking feature may be set or programmed to only work if the distance D between the mobile control node 624 (or immobilizer key 150) and the TP unit 628 is within the predefined range D to ensure safety and security of the operator as well as the vehicle.

For a passive locking function, it is desirable that the ignition key be in the OFF position, and that all of the doors be in the closed position before such a function will operate. The locking function may occur when the estimated range between the mobile control node 624 and the TP unit 628 is greater than a predefined distance and the distance is increasing, and an RKE lock signal has not been received. If these conditions are met then the TP unit 628 or some other element of the vehicle control system 120 may actuate the relay or the solenoid 184 directly to lock the doors. Upon locking the doors, the vehicle alarm system may be armed.

Vehicle Locator

In addition to serving as a node in a controller area network in a vehicle, mobile control node 624 and TP unit 628 can provide a vehicle locator service. As will be appreciated, it can sometimes be difficult to locate a vehicle which has been parked in a busy parking lot or which has otherwise been out of sight for some time. Accordingly, mobile control node 624 and TP unit 628 can interoperate to provide a user holding mobile control node 624 with an indication of the location of vehicle 630 relative to the location of mobile control node 624.

Specifically, mobile control node 624 will, from time to time, attempt to communicate with TP unit 628. If mobile control node 624 is within radio communication range of TP unit 628, the vehicle location function can be commenced, either automatically, or by a user input on keypad 720.

In addition to providing a range or distance to the user's vehicle, the preferred embodiment also provide a direction, or bearing, indicating the location of the vehicle relative to the mobile control node 624. Accordingly, the high probability range estimate produced at TP unit 628 in the vehicle is transmitted to mobile control node 624 where it is used with the high probability range estimate produced at mobile control node 624 to determine the bearing between mobile control node 624 and the vehicle.

Figure 5:
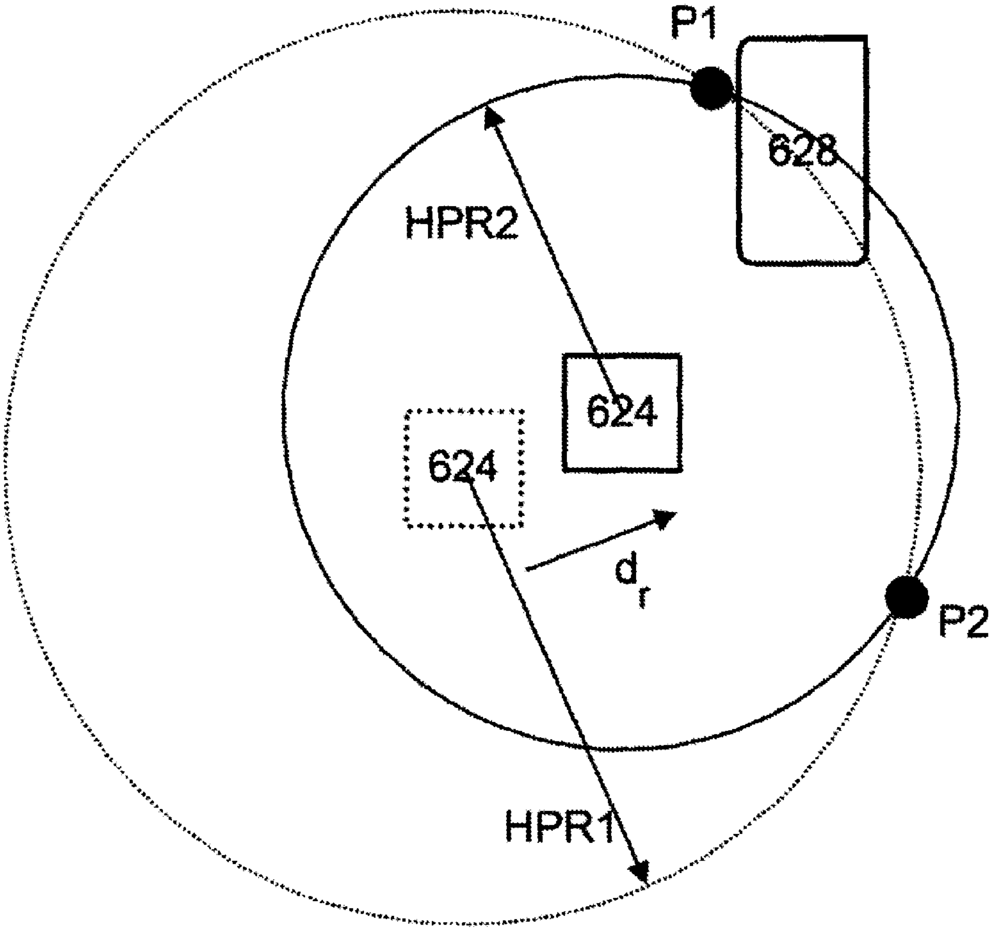
FIG. 5 shows a schematic representation of a step in a vehicle location function provided in the system of FIG. 1.

FIG. 5 shows mobile control node 624 at a first position (indicated by dashed line) with respect to TP unit 628 in the vehicle to be located. The high probability range, determined as described above, between mobile control node 624 and TP unit 628 is indicated by the circle with radius HPR1.

As the user holding mobile control node 624 walks some distance in some direction to a second position (indicated by solid line), the range between the mobile control node 624 and TP unit 628 decreases to HPR2, again as determined by the above-described process, and is indicated in the Figure by the circle with the solid line. As can be seen, the first circle with radius HPR1 intersects at two points, P1 and P2, with the circle with radius HPR2.

Figure 6:
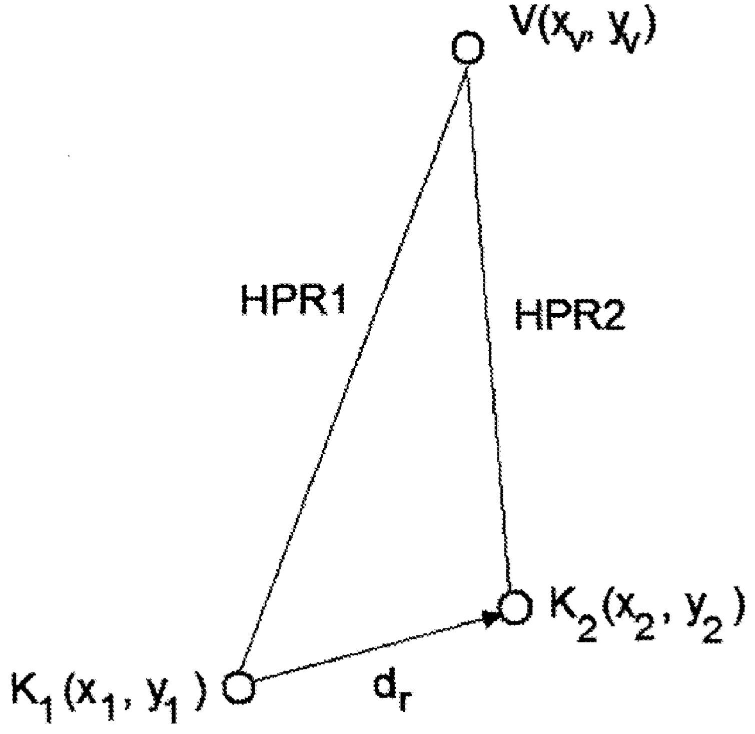
FIG. 6 shows the geometric analysis used in the vehicle location function provided in the system of FIG. 1.

In view of the above, the bearing from mobile control node 624 to TP unit 628 in the vehicle can be estimated, with reference to FIG. 6, as follows:

(1) The vehicle V is at position $V(x_v, y_v)$, mobile control node 624 is at position $K_1(x_1, y_1)$ and the high probability range between mobile control node 624 the vehicle is HPR1.

(2) The user holding mobile control node 624 moves to a new location $K_2(x_2, y_2)$ and the high probability range between mobile control node 624 and the vehicle is HPR2.

(3) The relative distance traveled from position $K_1(x_1, y_1)$ to $K_2(x_2, y_2)$ is denoted by $d_r$. This relative distance is obtained from accelerometer 724 in mobile control node 624. The relative direction of the travel is given by $$HPR_2^2 = HPR_1^2 + d_r^2 - 2HPR_1 d_r \cos(\theta_{1,2}) \quad (1)$$

$$\cos(\theta_{1,2}) = \frac{HPR_1^2 + d_r^2 - HPR_2^2}{2HPR_1 d_r} \quad (2)$$

where $\theta_{1,2}$ is the relative angle between the two points $K_1$, $K_2$. The relative angle $\theta_{1,2}$ can be obtained from the above equation.

(4) Since the two circles with centers at $K_1(x_1, y_1)$, and $K_2(x_2, y_2)$ have different radii HPR1, HPR2, they intersect at two points, namely $V(x_v, y_v)$ (point P1 in FIG. 5), and another point $V'(x_{v'}, y_{v'})$ (point P2 in FIG. 5). These points can be determined as follows:

for point $P_1$ $$x_v = x_1 + \cos(\theta_{1,2})^2 + \sin(\theta_{1,2})\sqrt{R_1^2 - d_r^2} \tag{3}$$

$$y_v = y_1 + \cos(\theta_{1,2})\sin(\theta_{1,2}) - \cos(\theta_{1,2})\sqrt{R_1^2 - d_r^2} \tag{4}$$

and for point $P_2$ $$x_{v'} = x_1 + \cos(\theta_{1,2})^2 - \sin(\theta_{1,2})\sqrt{R_1^2 - d_r^2} \tag{5}$$

$$y_{v'} = x_1 + \cos(\theta_{1,2})^2 + \cos(\theta_{1,2})\sqrt{R_1^2 - d_r^2} \tag{6}$$

Initially, mobile control unit 624 will not be able to determine which of the two possible intersection points is the correct location of TP unit 624 and can arbitrarily pick either one, or some point in between. However, as the above described process is repeated, the location of the one of points P1 and P2 which corresponds to the location of TP unit 628 will vary only minimally, while the location of the other of points P1 and P2 will vary significantly and mobile control node 624 will deem the relatively unvarying point (P1 or P2) as the location of TP unit 628 and will provide bearing information with respect to that point.

(5) As the user holding mobile control node 624 moves in the area, the high probability range and locations of P1 and P2 are determined for each location providing multiple estimates of $V(x_v, y_v)$ and the relative direction from mobile control unit 624 to the vehicle can then be estimated using the following:

$$\tan(\theta_{i,v}) = \frac{(x_v - x_i)}{(y_v - y_i)} \tag{3}$$

where $\theta_{i,v}$=the relative heading (direction) between the vehicle and mobile control node 624 at point $K_i$ $(x_i, y_i)$.

(6) Compass 728 provides the heading $\theta_k$ of the mobile control node 624 at position $K_i$ $(x_i, y_i)$ and the compass bearing to the vehicle $\theta_v$ can be obtained from:

$$\theta_v = \theta_k + \theta_{i,v} \tag{4}$$

It should be noted that, the above assumes that HPR1 is greater than HPR2, i.e.—that the user is walking towards the vehicle. In the event that the user is walking away from the vehicle (i.e.—HPR2>HPR1), then mobile control unit 624 will instruct the user to reverse their direction and the process will recommence.

It is contemplated that, to improve the accuracy of the vehicle location process, the high probability range determined at TP unit 628 can be communicated to mobile control node 624 and appropriately combined with the high probability range determined at mobile control node 624 for use in the vehicle locating function. The high probability ranges can be averaged, or otherwise statistically processed, to reduce errors which could otherwise result in reduced accuracies in the above described bearing determination process.

In practice, utilizing the Jeninc JN5139 or JN5147 transceiver, the bearing displayed to the user may be updated after every 5 or 6 steps, or about every 3-5 meters of walking distance. The accuracy improves after about 15-20 steps once the algorithm has had an opportunity for a few iterations, in which case the error margin is anticipated to be about plus/minus 11.25 degrees after 15-20 steps. The error margin is expected to improve as the range between the mobile control node and the vehicle decreases.

Figure 9:
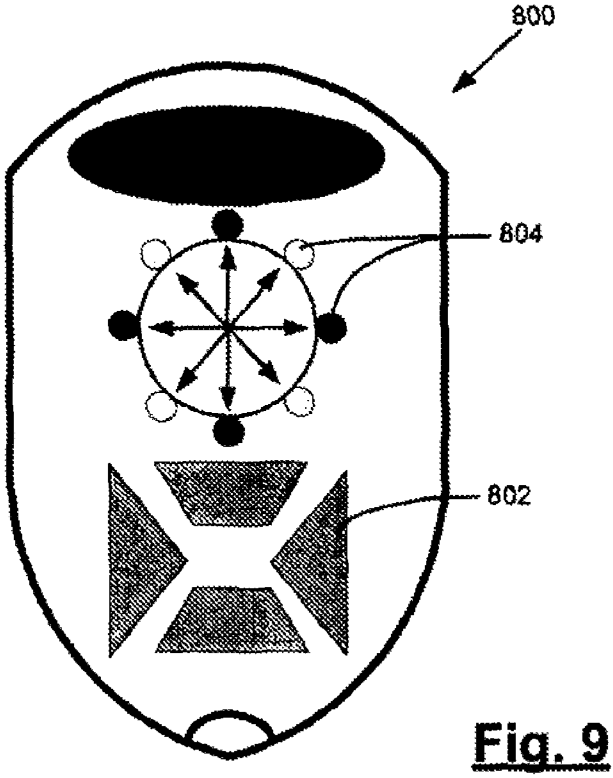
FIG. 9 illustrates one embodiment of a key fob useful with the system of FIG. 1.

In circumstances where a lower cost key fob is desired but the vehicle locator functionality retained, the display screen 716 may be optionally omitted and replaced with a series of small light sources arranged in a closed loop. For example, FIG. 9 shows an alternative key fob 800 which has a number of momentary contact switches 802 providing various predetermined vehicle control commands. The fob 800 also includes a series of, for example, eight light emitting diodes (LEDs) 804 arranged in a circle. The appropriate LED 804 is energized to correspond to the directional bearing output of the vehicle locator function.

Also, while the preferred embodiment utilizes an accelerometer or pedometer to determine the distance $d_r$ that the user/key fob travels, an alternative less expensive albeit likely less accurate means for determining or estimating the travel distance of the user/key fob is based on an algorithm which estimates the travel distance based on a presumed walking speed (typically 3-4 mph). Thus the fob travel distance can be calculated by processor 712 based on such an algorithm. An accelerometer is however, preferred, because it provides additional functions such as waking up the mobile control node from a sleep mode, and it may also be used to obtain the orientation of the mobile control node which is useful for determining compass direction.

In addition to the ability to provide an indication to a user of the range and bearing from mobile control unit 624 to a vehicle containing TP unit 628, it is also contemplated that mobile control unit 624 can optionally be configured to also usefully provide an indication to the user of the height at which the vehicle containing TP unit 628 is located. For example, if the vehicle was parked in a multi-level parking garage, the user may have forgotten which level the vehicle was left on. In this case, an indication of the height of the vehicle can prove useful in assisting in the location of the vehicle.

In embodiments of the present invention where it is desired to provide an indication of the height of the vehicle, TP unit 628 can function in response to inputs from electronic compass 652, three-axis accelerometer 656 and/or an inclinometer 660. Specifically, on an ongoing basis, TP unit 628 will monitor changes in the inclination of the vehicle in which it is installed and the speed at which it is moving to determine it change in height. TP unit 628 will calculate and store changes in its height for a selected period of time, for example for the last ten minutes of operation of the vehicle.

Figure 10:
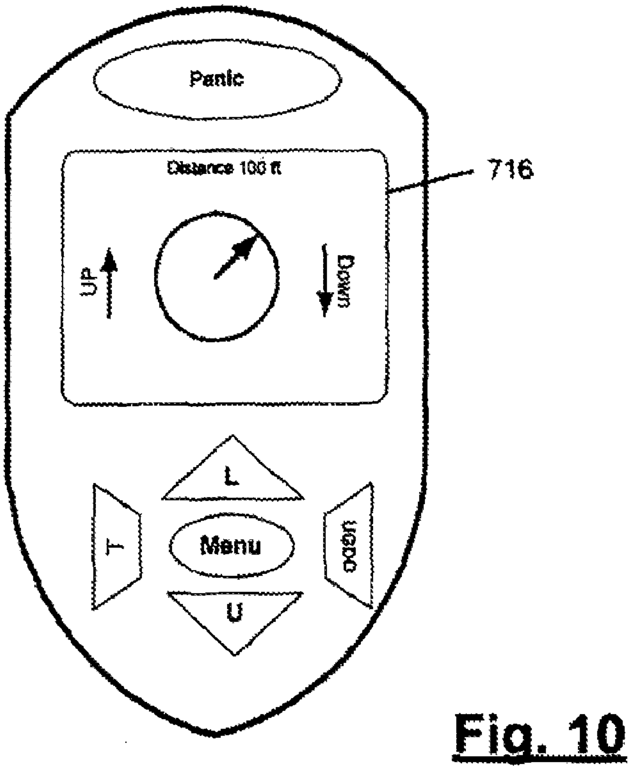
FIG. 10 shows another embodiment of a key fob used with the system of FIG. 1.

In this manner, if the vehicle is driven up two or more levels of a parking garage and then parked, TP unit 628 will have stored in its memory a determination that it has traveled up (or down) some amount equivalent to the inclinations it has measured and the distance it traveled at those inclinations. When mobile control node 624 begins communicating with TP unit 628 as part of the vehicle location process discussed above, TP unit 628 can transmit the stored height value, previously determined, to mobile control unit 624 which can then display this height information to the user. Accordingly, display 716 could, for example, indicate that the user's vehicle is located 300 meters away, at a bearing of fort-five degrees and that, at the time the vehicle was parked, it was approximately twenty-five feet above ground. An example display screen for the vehicle locator function is shown in FIG. 10.

Thus, and in accordance with the present invention, the owner of a vehicle when distant from and seeking to locate where his or her vehicle is parked, simply takes out a key-fob (or another personally-carried device such as a cell phone, PDA or the like) and typically initiates a "car locate" function by pressing a suitable button on the key-fob (or by voice activation or by another user-input). Such user-input to initiate the car-locate function is desirable to prolong battery life. Once the car-locate function is initiated, the owner simply begins to walk in any direction and by looking at the likes of an arrow display on the hand-held key-fob (and/or by following audible instructions generated at the key-fob or delivered over a phone connection to a cell phone or the like) changes his or her walking direction by following the displayed arrow or similar instructions until the parked vehicle comes into plain view and is thus located. To achieve this, the owner must begin to walk in any direction he or she chooses and then the combination of the fob travel estimation element (such as provided via an accelerometer or similar pedometer or a walking distance estimating algorithm) and the compass element, that are both included in the hand-held key-fob, with the triangulation techniques described above (preferably based on time of flight calculations) will allow the system determine the distance (at any given step taken by the owner as he or she walks) from where the owner happens to be relative to the car location as well as whether the owner is walking towards or not towards the parked location of the vehicle in question. By providing the likes of an arrow or equivalent indicator at a display on the key fob that points in the direction where the system has determined the vehicle to be parked, the owner can simply change his or her walking direction to essentially "follow-the-arrow-on-the-key-fob-to-the-parked vehicle". This system can be of particular benefit in the likes of car-rental lots where the prospective driver has not himself or herself parked the vehicle to begin with. The system of the present invention can locate a vehicle without need to use potentially expensive components/methods such as GPS systems and the like, and the system of the present invention is particularly beneficial and economic as it preferably uses the same wireless communication link to the vehicle as would otherwise be present for keyless entry and/or remote start of the vehicle. Thus an OEM automaker can economically provide a plurality of features (such as car locate and keyless entry or car locate and remote start and keyless entry) using common transmit/receive hardware. The system will detect if the owner is walking towards or not towards the parked location after the owner has taken only a few steps (typically less than about 20 steps, more preferably less than about 10 steps, and most preferably less than about 5 steps) and the direction arrow or indicator that guides the key-fob holder to the parked vehicle thus changes rapidly should the person not be walking in a direction towards the parked vehicle (or should the person deviate from the direction towards the parked vehicle). Thus the system detects and utilizes the physical travel of the portable mobile device (such as a key-fob) as borne by the person searching for the location of the parked vehicle and by triangulation, by time-of-flight determinations of wirelessly transmitted signals between a transceiver in the mobile device and a transceiver fixed in the parked vehicle, by distance moved local to where the person is walking while searching for the vehicle and by a bearing determination made by the likes of a compass borne in the hand-held portable mobile device being carried by that person while searching for the parked vehicle, a control in the mobile device computes both the distance and bearing to the parked vehicle and communicates this (such as via a visual and/or audible information indicator) to the person to guide to the parked vehicle.

Security and Authentication

In order to prevent unauthorized use of, or access to, vehicle 630, an appropriate authentication system is employed with TP unit 628 and mobile control node 624. The present invention is not limited to any specific authentication system, and a variety of such systems are commonly employed, but in general a mobile control node 624 must be authenticated to a TP unit 628 with which it is to interact and data transmissions between an authenticated mobile control node 624 and TP unit 628 are encrypted to prevent spoofing or eavesdropping by unauthenticated users.

In the preferred embodiment, the preferred IEEE 802.15.4/Zigbee communication protocol used to communicate between wireless devices incorporates a variety of security modes. In the preferred embodiment, the following security suite is implemented:

- access control, in which at least the TP unit 628 is programmed with an access control list that contains the addresses of devices with which communication allowed;
- encryption, wherein data is encrypted at the source and decrypted at the destination using the same key;
- integrity, when a message integrity code is added to a message, allowing the detection of any tampering of the message by devices without the correct encryption/decryption key; and
- sequential freshness, where a frame counter is added to a message in order to protect against replay attacks in which old messages are later resent to a device.

In addition to the foregoing, the preferred embodiment also includes a security suite at the application layer of the preferred communication protocol stack. Thus, for example, any additional security schemes employed by automotive original equipment manufacturers (OEMs) can also be implemented to ensure secure communication between the mobile control node 624 and TP unit 628. In particular, additional rolling code algorithms may be employed at the application layer, if desired.

In the preferred embodiment, the TP unit 628 can preferably join other wireless networks such as home security network 160. In this case, the TP unit 628 and the coordinator of the home security network (which will typically be the main security controller) are placed into a programming mode by initiating a pre-defined action such as the user depressing certain keys on the mobile control node 624 and a keypad associated with the home security system within a short period of time of one other. Once in the program mode, an application layer program may then establish a gateway link between the networks (wherein the TP unit 628 presents itself as a separate node in each distinct network), or more preferably, the wireless area network IDs and the channel utilization of both networks are reconfigured, as required, to be the same, in which case the vehicle wireless network 110 forms a sub-network or tree in the other wireless network. Thereafter, the unique address of the TP unit 628 and/or the unique address of the coordinator are placed on the access control lists of these devices, facilitating future communication between the devices, and no other. In addition, as an application layer security suite, the vehicle ID number (VIN) may be transferred to the coordinator to function as a key to authenticate the vehicle with the home security network. Once the network set up has been established, the TP unit 628 will move with the vehicle and from time to time go out of range with the coordinator, in which case the TP unit 628 will send 'orphan' messages to automatically re-establish communications with the coordinator when the vehicle returns to the vicinity thereof.

In other embodiments, the other wireless area networks may be 'open', allowing any vehicle equipped with a TP unit 628 implementing the preferred communication protocols to join the network on ad hoc basis. In such a case, the host network is preferably programmed to accept any discovery messages transmitted by TP unit 628 and allow it to temporarily join a wireless network associated with the toll gate. An example of such an open system is a toll gate, where the vehicle 630 communicates the YIN number and/or unique address of the TP unit 628 to the tolling infrastructure. Upon receipt of such information, the tolling infrastructure may run a cross-check through vehicle databases to confirm, for example, the license plate of the vehicle, and automatically charge or debit a user account or credit card.

Utilizing such infrastructure, one advantage of the preferred embodiment is that a mobile control node 624 can be authenticated to more that one TP unit 628, and hence to more than one vehicle. Presently, vehicles which are equipped with remote keyless entry (RKE) systems require their users to carry a key fob which has been authenticated to the vehicle. However, as such key fobs can only be authenticated to a single vehicle, users with multiple vehicles must carry multiple key fobs, one for each vehicle. In contrast, in the preferred embodiment mobile control node 624 can be bound or authenticated to two or more vehicles with processor unit 712 storing the appropriate application level authentication values, encryption seed values and/or any other information required to successfully communicate with each vehicle.

A mobile control node 624 can be authenticated, in any appropriate manner, to the TP unit 628 in each vehicle it is wished to control and the corresponding authentication data is stored in memory associated with processor 712. In such a case, the mobile control node 624 can be authenticated to each desired vehicle via any suitable Challenge/Response scheme as will be understood by those of skill in the art. By using a standard communication protocol, such as the above-mentioned IEEE 802.15.4 protocol, appropriate encryption is applied to the Challenge/Response messages exchanged between mobile control node 624 and the TP unit 628 in a vehicle the mobile control node 624 is being authenticated with.

As the mobile control node 624 is authenticated to a TP unit 628 in a specific vehicle, Vehicle VIN data, PCM/ECM ID data, security codes and random number seed values (which were appropriately programmed into TP unit 628 at the time of vehicle assembly) are exchanged with the mobile control node 624 and are stored in an appropriate data structure in mobile control node 624 which is uniquely associated with the specific vehicle.

Similarly, a unique identification code for the mobile control node 624 and/or associated security codes and random number seed values are stored in an appropriate data structure in TP unit 628 associated with that mobile control node 624.

It is contemplated that the authentication between one or more mobile control nodes 624 and a TP unit 628 in a vehicle can be performed during manufacture of the vehicle, can subsequently be performed at a vehicle dealership and/or can be performed by a vehicle purchaser who can implement a set of specific operations to place the system into a secure configuration or programming mode which permits authentication of mobile control nodes 624. In this latter case, the customer can authenticate one or more additional mobile control nodes 624 to a purchased vehicle.

To control a particular pre-authenticated vehicle, a user is either prompted or otherwise initiates the activation of a key, or sequence of keys, on keypad 720 to instruct mobile control node 624 as to which vehicle it is desired to control. Processor 712 will then employ the corresponding authentication values stored in its memory for the selected vehicle to transmit and receive commands to and from the selected vehicle. As will be apparent to those of skill in the art, appropriate prompts for the selection process can be displayed on display 716, if desired.

While at least the security-related commands (PKE and/or RICE related commands) sent from mobile control node 624 to TP unit 628 in a vehicle are preferably encrypted, it is contemplated that all communications between mobile control node 624 and TP unit 628, can be encrypted if desired. In such a case, the encryption employed can be related to the authentication employed for the RKE for the vehicle or the encryption cart be any suitable standalone encryption system as will be apparent to those of skill in the art. If mobile control node 624 is authenticated with multiple vehicles, appropriate corresponding encryption keys and/or seeds will be stored in mobile control node 624 for each vehicle.

Applications with other Wireless Networks

Figure 11:
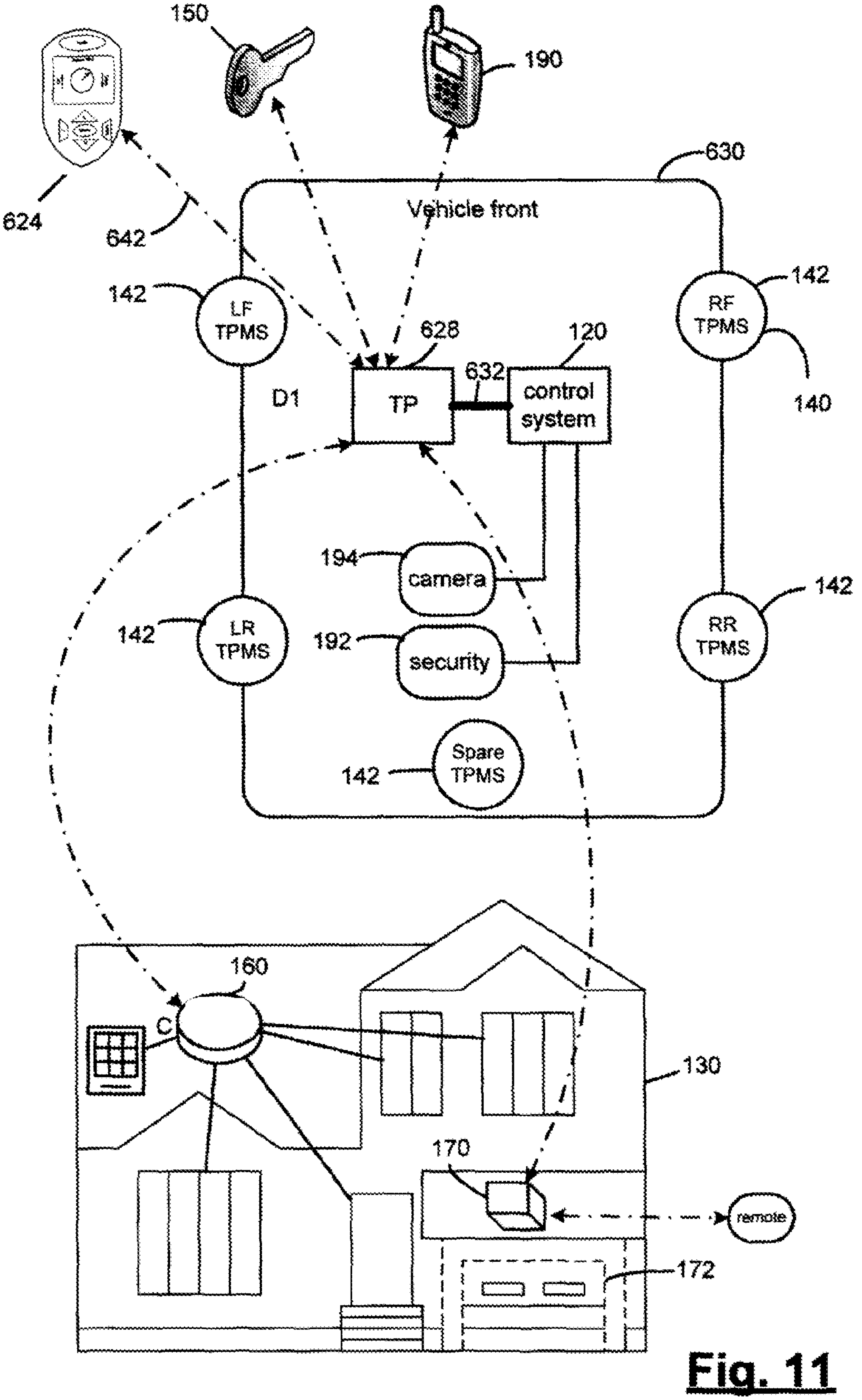
FIG. 11 shows a schematic diagram another wireless communication system, which includes a cell phone.

A wireless vehicular network that can form connections with other networks has many potential applications. For example, as shown in FIG. 11, the vehicular communication network 110 may include a cell phone 190 (in addition to or as the device providing the function of mobile control node 624) which incorporates an integrated processor/transceiver 154 such as provided by the JN5139. In this case, the cell phone 192 may be used as an output device to report certain vehicle status. For example, in the event an airbag is actuated, or a collision is otherwise detected by a crash sensor, the vehicle control system 120 may send a message to the cell phone 192 via TP unit 628, and in response application software executed by the cell phone may automatically deliver a text message or pre-recorded voice message describing the event to a pre-designated designated e-mail address. Similarly, data such as peak vehicle speeds or GPS destinations may be stored in the vehicle control system, and later downloaded as text messages to either the mobile control node 628 or cell phone 190—a useful feature for enabling parents to monitor their teenagers' behavior.

In another application, a vehicle security system 192 may detect a certain event such as an unauthorized door, hood or trunk opening (e.g., via door switches), unauthorized ignition start (e.g., via central engine computer), glass breakage (e.g., via microphone), or unauthorized movement (e.g., via an accelerometer installed in the vehicle). The vehicle control system security 120 can communicate any such security event information to the remote control node 628. In addition, if the vehicle 630 has a passenger cabin camera 194 as known in the art, for example, to provide an occupancy sensor, the vehicle control system 120 can take one or more pictures or images of the passenger cabin and communicate such images to the mobile control node 628, or cell phone 190, which can also communicate such information to a predetermined recipient. (A suitable camera/occupancy sensor system is described in U.S. Pat. No. 5,877,897; U.S. Pat. No. 6,690,268; and U.S. Pat. No. 6,783,167, the contents of which are each incorporated herein by reference.) It should be appreciated that the first few moments in a vehicle theft can be important as the mobile control node or cell phone may be in range and an image can be captured of the person causing the disturbance. In such an event, the TP unit 628 is preferably operated to transmit at maximum power levels. The image(s) of the interior cabin may also be communicated on demand, in response to an explicit command entered by the user at control node 624.

In the event the vehicle 630 is actively linked with home security network 160, the home security network controller and TP unit 628 preferably exchange frequent 'heartbeat' messages in order to detect the continuous presence of one another. Such messages can be executed synchronously via guaranteed time slot access available in the preferred communication protocol, or asynchronously, via sequential message transfers and countdown timers. The unexpected absence of such messages, for example, by not turning off this function following an authorized starting of the engine, may indicate that the vehicle has been moved without authorization, in which case the home security network may trigger an alarm. Likewise, the vehicle security system may also trigger an alarm if. Similarly, any of the aforementioned security events detected by the vehicle security system and/or image(s) of the passenger cabin can be communicated to the home security controller via TP unit 628 at any time. So too, an unexpected change in the estimated distance between the vehicle and home security controller, for example, when the home security system is armed to protect the home and vehicle, may also trigger an alarm.

Optionally, elements of the system of the present invention may be included in interior mirror assemblies, exterior mirror assemblies and/or accessory modules or consoles of the types described in U.S. Pat. Nos. 7,004,593; 6,824,281; 6,690,268; 6,250,148; 6,341,523; 6,593,565; 6,428,172; 6,501,387; 6,329,925; 6,326,613; 6,672,744; 6,386,742; and 6,124,886, and/or U.S. patent application Ser. No. 10/739,766, filed Dec. 18, 2003 by DeLine et al. for MODULAR REARVIEW MIRROR ASSEMBLY, now U.S. Pat. No. 6,877,888; Ser. No. 10/958,087, filed Oct. 4, 2004 by Schofield et al. for VEHICLE ACCESSORY MODULE; and/or Ser. No. 11/201,661, filed Aug. 11, 2005; Ser. No. 10/556,754, filed Nov. 15, 2005; and/or Ser. No. 10/355,454, filed Jan. 31, 2003 by Schofield et al. for VEHICLE ACCESSORY MODULE, now U.S. Pat. No. 6,824,281, and/or PCT Application No. PCT/US03/03012, filed Jan. 31, 2003 by Donnelly Corporation for VEHICLE ACCESSORY MODULE, and/or PCT Application No. PCT/US03/40611, filed Dec. 19, 2003 by Donnelly Corporation for ACCESSORY SYSTEM FOR VEHICLE, and/or PCT Application No. PCT/US04/15424, filed May 18, 2004 by Donnelly Corporation et al. for MIRROR ASSEMBLY FOR VEHICLE; and/or Ireland pat. applications, Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference in their entireties.

The above-described embodiments are intended to be examples of the present invention and alterations and modifications may be effected thereto by those skilled in the art without departing from the scope of the invention.

We claim:

1. A vehicular locating system, comprising:

a first data processor and transceiver unit for mounting in a vehicle;

a mobile device, the mobile device having a second data processor and transceiver unit for wireless bi-directional communication with the first data processor and transceiver unit, and a user interface system operatively connected to the second data processor and transceiver unit; and characterized in that the first data processor and transceiver unit and the second processor and transceiver unit interoperate to determine a series of estimates of a range between the vehicle and the mobile device by measuring a time of flight for radio communications between the vehicle and the mobile device, and in that the mobile device further includes a sensor for detecting travel of mobile device and a compass element for detecting a direction of movement of mobile device, the sensor and compass element being operatively connected to the second data processor and transceiver unit to produce estimates of the travel of the mobile device and wherein, as a user moves with the mobile device, at least one of the first and second data processor and transceiver units combining the determined travel of the mobile device with the series of estimates of the range between the vehicle and the mobile device to produce an estimated range and bearing from the mobile device to the vehicle.

2. The vehicular locating system according to claim 1 wherein the user interface system comprises a display screen operable to output a representation of the produced estimated range and bearing.

3. The vehicular locating system according to claim 1 wherein the user interface system comprises a series of lights to indicate the produced estimated bearing to the vehicle.

4. The vehicular locating system according to claim 1, wherein the first data processor and transceiver unit further includes an inclinometer operable, with the first data processor and transceiver unit, to produce an estimated height of the vehicle relative to the mobile device and to provide the estimated height to the mobile device via wireless communication.

5. A method of providing an estimate of a range between a mobile control node and a transceiver processor unit mounted in a vehicle, the mobile control node and the transceiver processor unit sharing a bi-directional data communication link, comprising:

determining a first set of raw range estimates from a first ranging modality comprising a time of flight for data transmissions between the mobile control node and the transceiver processor unit;

statistically processing the first set of raw range estimates, utilizing a Statistical Estimator/Predictor, to obtain a first filtered range estimate;

determining a second set of raw range estimates from a second ranging modality dependent upon the bi-directional data link;

statistically processing the second set of raw range estimates, utilizing a Statistical Estimator/Predictor, to obtain a second filtered range estimate;

providing each of the first filtered range estimate and the second filtered range estimate to an appropriate multiple models tracking method to obtain a statistically more probable range estimate;

providing the statistically more probable range estimate to a dynamic Bayesian network to produce a high probability range estimate; and outputting the high probability range estimate as an estimate of the range between the mobile control node and the transceiver processor unit.

6. The method of claim 5 wherein the Statistical Estimator/Predictor is an Extended Kalman Filter.

7. The method of claim 5 wherein the multiple models tracking method is an Interactive Motion Model.

8. The method of claim 5 wherein the dynamic Bayesian network is a Hidden Markov Model.

9. The method of claim 5 wherein the Statistical Estimator/Predictor is an Extended Kalman Filter, the appropriate multiple models tracking method is an Interactive Motion Model and the dynamic Bayesian network is a Hidden Markov Model.

10. The method of claim 5 wherein the second ranging modality is a received RF signal strength metric for the data transmissions between the mobile control node and the transceiver processor unit.

11. The method of claim 5 further comprising the steps of:

obtaining a first output range estimate at a first location of the mobile control node with respect to the vehicle;

obtaining a second output range estimate at a second location of the mobile control node with respect to the vehicle;

determining a distance and direction between the first location and the second location; and processing the first output range estimate, the second output range estimate and the determined distance and direction to obtain an estimated bearing indicating the direction of the vehicle relative to the mobile control unit at the second location.

12. The method of claim 11 wherein each of the first output range estimate and the second output range estimate is determined at each of the mobile control unit and the transceiver processor unit and the first range estimate and second range estimate determined at the transceiver processor unit is communicated to the mobile control node and is combined with the first range estimate and second range estimate determined at the mobile control node to reduce the error in the estimated bearing.

13. The method of claim 11 wherein the second range estimate and the estimated bearing are displayed to a user on a display screen on the mobile control node.

14. A method of locating a vehicle, comprising:

(i) provisioning a user with a mobile device having a user interface;

(ii) provisioning the vehicle with a transceiver, wherein the mobile device and the transceiver communicate via a wireless data communication link;

(iii) periodically estimating a range between the transceiver and the mobile device using a determination of a time of flight for data transmission between the transceiver and the vehicle as the user moves with respect to the vehicle;

(iv) calculating a direction between the user and vehicle based on a change in distance between the mobile device and the transceiver and the distance moved by the user; and (v) outputting the calculated direction to the user through the user interface.

15. The method of claim 14 wherein steps (iii) through (v) are repeated on an ongoing basis to assist the user to locate the vehicle.

16. The method of claim 14 wherein step (iii) further employs a second range estimation modality and results of the time of flight modality and second range estimation modality are combined to produce the estimated range.

17. The method of claim 16 wherein the second range estimation modality employs a received RF signal strength of the communication between the mobile device and the transceiver.

* * * * *

UNITED STATES PATENT AND TRADEMARK OFFICE

CERTIFICATE OF CORRECTION

PATENT NO. : 8,373,581 B2
APPLICATION NO. : 12/664110
DATED : February 12, 2013
INVENTOR(S) : Hasib Hassan, Devendrea Bajpai and Uri Levy It is certified that error appears in the above-identified patent and that said Letters Patent is hereby corrected as shown below:

In the Specifications:

Column 1
Line 34, "ad/or" should be --and/or--

Column 5
Line 36, "used" should be --useful--
Line 38, Insert --of-- after "diagram"
Line 53, "tom" should be --term--

Column 6
Line 11, "Smart." should be --Smart--
Line 51, "WEE" should be --IEEE--

Column 12
Line 12, "RSSL/LQI" should be --RSSI/LQI--
Line 35, Insert --Similarly,-- after "EKF."

Column 18
Line 17, "when" should be --where--

Column 19
Line 3, "YIN" should be --VIN--

Column 20
Line 2, "RICE" should be --RKE--
Line 8, "cart" should be --can--

Signed and Sealed this
Sixteenth Day of April, 2013

Teresa Stanek Rea
*Acting Director of the United States Patent and Trademark Office*